INVENTOR.
Frank G. Weis

July 30, 1963　　　F. G. WEIS　　　3,099,224
WEIGHING CONTROL FOR LIQUID HANDLING APPARATUS
Filed April 18, 1961　　　2 Sheets-Sheet 2

INVENTOR.
Frank G. Weis
BY
Avery, Schmidt, Johnson & Hoxy
ATTORNEYS.

United States Patent Office 3,099,224
Patented July 30, 1963

3,099,224
WEIGHING CONTROL FOR LIQUID
HANDLING APPARATUS
Frank G. Weis, Kansas City, Mo., assignor to Union Tank
Car Company, Chicago, Ill., a corporation of New
Jersey
Filed Apr. 18, 1961, Ser. No. 103,755
15 Claims. (Cl. 103—243)

This invention relates to apparatus for handling material and more particularly, for handling fluids or flowable material which can conveniently be conveyed through pipes or conduits by the force of fluid under pressure.

One of the most important objects of this invention is to provide apparatus capable of receiving and storing material until a predetermined quantity has accumulated, at which time the material is automatically ejected and the apparatus is ready to receive additional material.

Yet a further object is to provide apparatus which utilizes a portion of its support as a deflectable member responsive to the weight of material contained within its tank, thus effecting accurate weight control without the necessity of springs, knife-edged bearing surfaces, or conventional weighing devices.

Another object of this invention is to provide handling apparatus capable of alternately receiving and ejecting material automatically, thus eliminating the necessity for operator control.

A still further object of this invention is to provide handling apparatus wherein the ejecting cycle is initiated by the weight of accumulated material and is continued until substantially all of the material is ejected.

Another object of this invention is to provide apparatus wherein the initiation of the ejecting cycle is adjustable over a wide range of material accumulations.

Another object is to provide a material handling apparatus having a minimum of bearing surfaces, thus minimizing required maintenance.

Still other important objects of this invention will be made clear and become apparent as the following description of the invention progresses.

In the handling of flowable material, it is often necessary to accumulate the material for a certain period of time and then eject the material under pressure to a higher elevation. This may be necessary because the fluid must be discharged at a higher elevation than that of the storage point, as for example, in some sewage disposal system. It is not economical or convenient to have the pressure necessary for discharging the material applied continuously. The present invention is particularly adapted to provide apparatus capable of receiving small quantities of flowable material until a predetermined quantity has accumulated, at which time the storage tank will be emptied automatically and the apparatus again readied for receiving material.

Figure 1:
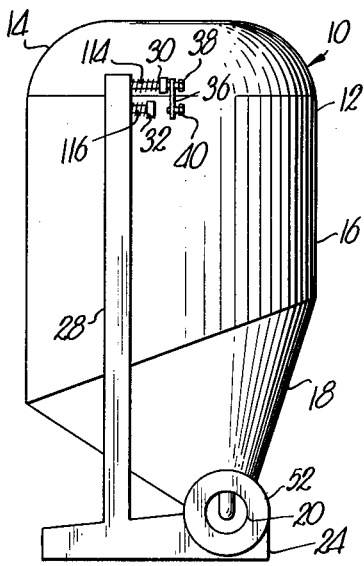
FIGURE 1 is a side elevational view of the apparatus.
Figure 2:
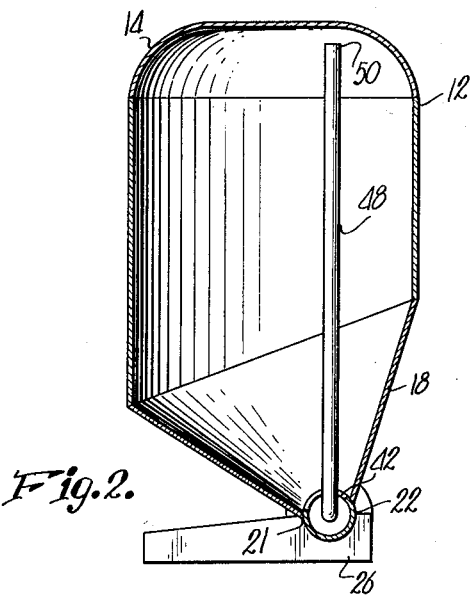
FIG. 2 is a vertical, cross-sectional view taken along line 2—2 of FIG. 3 showing the air pipe in elevation.
Figure 3:
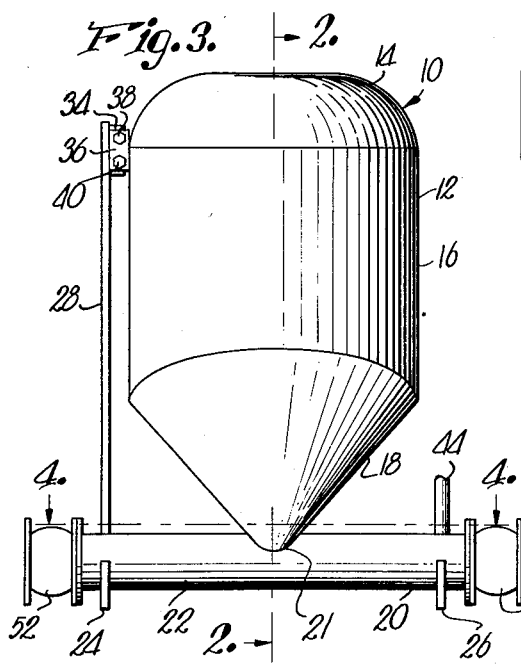
FIGURE 3 is an end elevational view.
Figure 4:
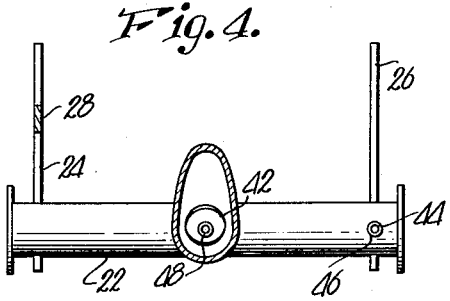
FIG. 4 is a horizontal section taken along line 4—4 of FIG. 3.

The material handling apparatus broadly designated 10, includes a generally tubular, closed material container or storage tank 12 having a spheroidal dome 14, a generally cylindrical wall 16, and an irregular, frusto-conical base portion 18. The tank 12 overlies and is supported by a material conduit 20. The base portion 18 is rigidly attached to a resilient portion 22 of conduit 20 by mounting means such as welding as at 21 in FIG. 3. Tank 12 is positioned over conduit 20 in such a manner that a greater volume of tank 12 overhangs one side of conduit 20 than the other.

A pair of generally elongated, spaced, trapezoidal legs 24 and 26 are rigidly secured to conduit 20 supporting the latter on each side of tank 12, but with the portion 22 without support in the vicinity of weld 21 attaching tank 12 to portion 22.

Legs 24 and 26 are secured to conduit 20 adjacent one end of the legs, thereby providing a lateral projection extending perpendicularly from the axis of conduit 20 and generally horizontally on the side of the latter underlying the greater volume of tank 12. Rigidly secured to leg 24 is an elongated, vertically disposed riser 28 having a normally open, spring-biased, electrical switch 30, and a normally open spring-biased, electrical switch 32 is mounted on flange 34 which protrudes perpendicularly adjacent one end of riser 28.

Tank 12 is provided with a perpendicularly protruding, rigidly attached wing 36 disposed opposite flange 34. Contact points 38 and 40 are mounted upon wing 36 in position to operably engage switches 30 and 32 respectively as wing 36 is moved toward flange 34.

Conduit 20 has an aperture 42 providing means for placing conduit 20 in communication with the inside of tank 12. A pipe 44 enters conduit 20 through aperture 46, extends axially along the inside of conduit 20, and enters the inside of tank 12 through aperture 42, preferably spaced from the latter. Aperture 46 is sealed around pipe 44 to prevent leakage of material from conduit 20. Pipe 44 has a vertically extending segment 48 which rises above aperture 42 and terminates within tank 12 at end 50 which is spaced from dome 14.

Check valves 52 and 54 are situated in conduit 20 on either side of resilient portion 22 and are of the conventional variety, allowing passage of material in one direction only.

Pipe 44 is provided with a 3-way valve 56 external of tank 12. Section 58 extends from valve 56, placing pipe 44 in communication with the atmosphere when valve 56 is disposed in one of its selectable positions. Segment 60 communicates from valve 56 to a source of compressed air 62 so that the pipe 44 may be connected to the compressed air 62 when valve 56 is disposed in its alternate position.

Figure 9:
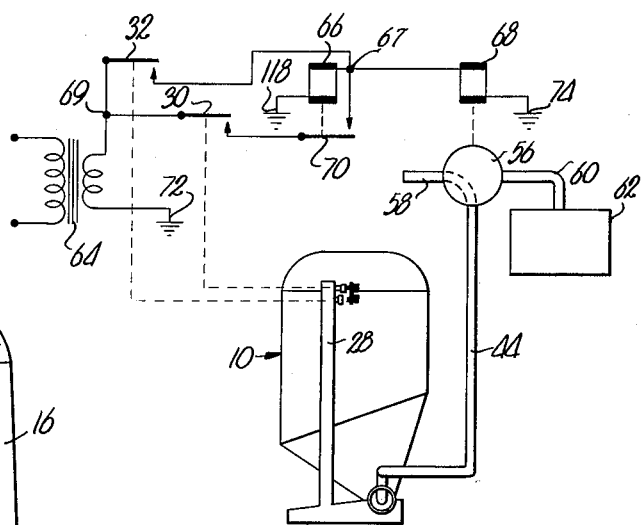
FIG. 9 is a schematic drawing illustrating the preferred way of controlling the apparatus electrically.
Figure 8:
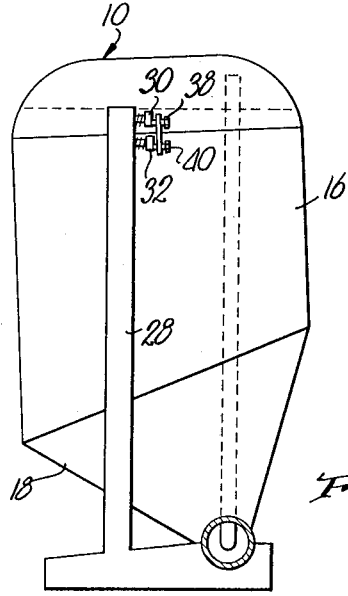
FIG. 8 is a side elevational view showing the position of the switches when the tank is full, showing the air pipe and material level in broken lines.

Electrical circuitry comprising the preferred means to automatically control the operation of means governing the flow of material into and out of tank 12 is best diagrammatically illustrated in FIG. 9. One side of the coil of switch relay 66 is connected to one side of the coil of an electrically responsive valve control relay 68 as at connection point 67. The other sides of the coils of relays 66 and 68 are grounded at points 118 and 74 respectively, to complete a first circuit electrically coupling relays 66 and 68 in parallel.

Normally open switch 30, normally open relay switch 70, and said first circuit are connected in series across a source of electrical energy as power supply transformer 64 to present a second circuit, it being understood that grounding point 72 on one side of the output of transformer 64 cooperates with grounds 118 and 74 to complete the electrical circuit. Relay switch 70 is operably coupled with relay 66 so that energization of the coil of the latter closes the normally open switch 70. A third circuit comprises normally open switch 32 electrically coupled in parallel to said switches 30 and 70 at points 69 and 67.

Figure 5:
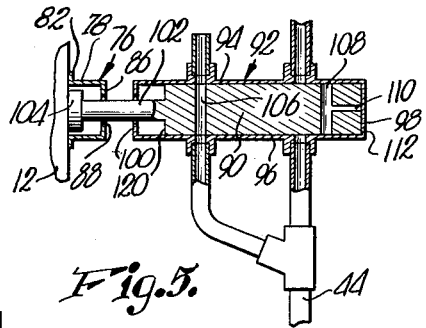
FIG. 5 is an enlarged, elevational view, partly in section, of a pneumatic control which may be used to control this apparatus.
Figure 6:
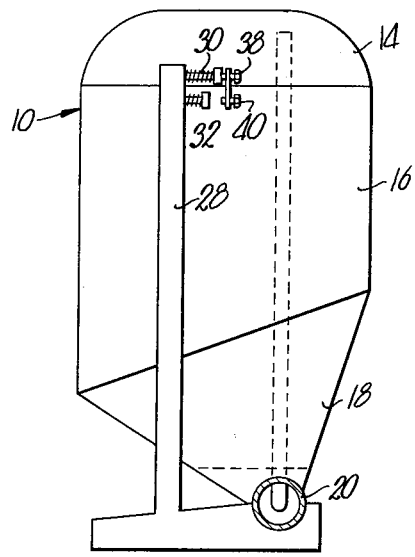
FIG. 6 is a side elevational view showing the relative positions of the switches when the tank begins to fill, the air pipe and the level of material within the tank shown by broken line.
Figure 7:
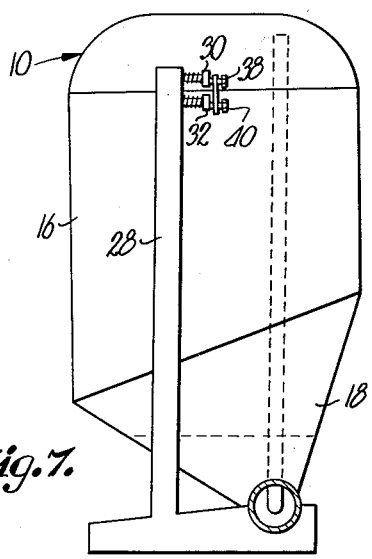
FIG. 7 is a side elevational view showing the position of the switches after a quantity of material has accumulated within the tank, showing the air pipe and material level in broken lines.

Although the preferred method of controlling apparatus 10 is by electrical circuitry means, this invention is not limited to such electrical control. As illustrated in FIG. 5, it is possible to control the ejection of material from tank 12 entirely pneumatically. A bracket generally designated 76, and provided with an annular, perpendicularly extending side 78, is rigidly coupled to tank 12 by means of an out-turned flange 82 integral with side 78, disposed parallel to wall 16 in abutting relationship thereto and rigidly coupled to the latter by welding or other suitable means. Bracket 76 is closed adjacent its end opposite tank 12 by end 86 integral with side 78 projecting inwardly from the center of the latter. A circular aperture 88 is disposed in the center of end 86.

Valve 92 having sliding valve member 90, is rigidly coupled to riser 28. Valve 92 is provided with side walls 94 and 96, and end walls 98 and 100, with wall 98 limiting the lateral shifting movement of sliding member 90 in one direction and wall 100 limiting such movement in the direction nearest tank 12. Valve member 90 is provided at one end thereof with a perpendicularly extending stem 102 of circular cross section integral with the latter and having an annular disc 104 rigidly coupled adjacent one end. Stem 102 is slidably received in end 86 through aperture 88.

Disc 104 is disposed within bracket 76 between tank 12 and end 86 and is freely shiftable from one to the other. Valve member 90 is provided with a pair of ports 106 and 108 and extending transversely through the latter. Ports 106 and 108 are so disposed that port 106 aligns with pipe 44 and section 58 when slidable member 90 is shifted to abut end wall 98. When port 106 is aligned with pipe 44 and section 58, port 108 is closed at each end by walls 94 and 96. When member 90 is shifted to abut end wall 100, port 108 is aligned with pipe 44 and segment 60. In this position, port 106 is closed at each end by side walls 94 and 96. Port 108 is provided with a perpendicularly extending aperture 110 of smaller diameter, placing port 108 in communication with end 112 of member 90.

In operation, apparatus 10 is disposed at a convenient point for receiving sewage or other material from a source to be serviced. Check valve 54 is interposed between the source of material and the tank 12 so that material may flow from the source in the direction of tank 12, but will be checked from flowing in a reverse direction. Material flowing through check valve 54 passes through conduit 20 and flows into tank 12 through aperture 42. The inside of tank 12 otherwise sealed by weld 21, is in communication with the atmosphere because pipe 44 communicates with the inside of tank 12 and extends to valve 56. The latter is in its position interconnecting pipe 44 with section 58. This allows the material to enter tank 12 and rise freely therein without an increase in the air pressure within tank 12, although the latter is completely sealed, except for pipe 44 communicating with the atmosphere.

As the material accumulates within tank 12, the greater volume of the material lies on one side of the support or conduit 20. The accumulation of the greater weight on one side of the support 20 causes portion 22 to be distorted torsionally and allows the tank 12 to rotate in the direction of the greater weight. Portion 22 of conduit 20 upon which tank 12 is rigidly fastened, is of a resilient material such as steel, and is capable of distortion torsionally, yet maintaining a bias against the rotation of the tank. The remainder of conduit 20, other than portion 22, will be held stationary by legs 24 and 26 extending laterally in the direction of the greater weight and in contact with the ground, a floor or other supporting surface upon which the apparatus 10 is sitting.

As tank 12 is rotated toward riser 28 extending from leg 24, wing 36 carrying points 38 and 40 thereon, is displaced toward switches 30 and 32. Switches 30 and 32 are so disposed that point 38 contacts switch 30 before point 40 makes contact with switch 32. Thus, switches 30 and 32 present first control means to be operated and points 38 and 40 comprises second control means responsive to the condition of distortion of portion 22 for operating the first control means.

Since switch 30 is yieldably biased by a spring 114, the movement of tank 12 will cause switch 30 to be closed from its normally open position. As can be seen from the diagram in FIG. 9, the closing of switch 30 does not complete an electrical circuit and, therefore, such closing has no effect of consequence as the material is being admitted into tank 12. When the material has reached a predetermined level, which may be near the full position of tank 12 yet below end 50, tank 12 has rotated sufficiently on portion 22 to cause point 40 to contact switch 32. As switch 32 is depressed against the bias of spring 116, switch 32 is closed from its normally open position. As may be seen from the diagram in FIG. 9, the closing of switch 32 completes an electrical circuit, thereby energizing switch relay 66 and valve control relay 68. Switch control relay 66 closes the normally open switch 70, thereby completing the electrical circuit of which switch 30 is a part.

The energizing of valve control relay 68 operates the 3-way valve 56 interrupting the communication from the inside of tank 12 to the atmosphere and placing pipe 44 in communication with the source of compressed air 62. This allows compressed air to flow into the inside of tank 12 through pipe 44. Such compressed air is of sufficient pressure to force the material within tank 12 out through aperture 42, and through check valve 52 to a sewer discharge line or other suitable discharge conduit.

It will be appreciated that the discharge line could be at a higher elevation than apparatus 10, yet material from within tank 12 will be ejected because of the pressure.

As the material within tank 12 begins to decrease in volume because of the discharge thereof, tank 12 will tend to return to its original position because of the bias of resilient portion 22 of conduit 20. As tank 12 begins to return, point 40 is removed from contact with switch 32, thereby allowing switch 32 under the bias of spring 116 to return to its normally open position. The opening of switch 32 will break the electrical connection of points 69 and 67 through switch 32. However, such breaking of this connection will not have the effect of returning the 3-way valve to its original position and thereby stopping the discharge of material from tank 12 because switch relay 66 has closed relay switch 70 and electricity flowing through switch 70 supplies the energy to relay 66 to hold switch 70 closed and the energy to relay 68 to hold valve 56 in the position to admit compressed air.

An electrical series circuit through switch 30, relay switch 70, and relay 66 across power supply 64, continues to hold switch 70 in its closed position. Inasmuch as switch 30 is closed because of the position of tank 12, and switch 70 is held in closed position by relay 66, an electrical circuit comprising power source 64, switch 30, switch 70 and valve control relay 68 connected to ground at point 74, is still in operation. This allows for the continuation of the interjection of compressed air to tank 12.

When tank 12 has been emptied so that it is returned to its original position, point 38 is withdrawn from switch 30, thereby allowing switch 30 to return to its normally open position. This breaks all electrical contact between power supply 64 and valve control relay 68, and allows 3-way valve 56 to return to its original position, thereby cutting off air supply 62 from tank 12 and placing the inside of tank 12 in communication with the atmosphere. The tank 12 is again in a position to receive material through conduit 20 until sufficient accumulation exists to operate the switches as previously described. This cycle will continue without the necessity of an operator controlling the switching as will be readily understood. Thus, it is apparent that flow-governing means including air source 62, supply lines for carrying fluid to tank 12, vent section 58 and valve 56, is operably coupled with suitable control means to automatically govern the flow of material into and out of tank 12.

It is conceivable that the apparatus 10 would desirably be situated at a point remote from a convenient source of electrical energy. The controlling of apparatus 10 is not limited to electrical switching means as previously described, but may also include any suitable controlling means. One such control is illustrated in FIG. 5 and is adapted to pneumatically control the cycling of apparatus 10 without the necessity for electrical power. As tank 12 is in its normally non-rotated position when tank 12 is empty of material, disc 104 will be abutted by tank 12. Member 90 is free to slidably reciprocate within valve 92 and the latter is rigidly fastened to the non-rotatable riser 28. The abutting of tank 12 against disc 104 will cause valve member 90 to be disposed in the position illustrated with face 112 abutting end wall 98. Inasmuch as this position places pipe 44 in communication with the atmosphere, it also cuts pipe 44 off from the source of compressed air 62.

As tank 12 is filled with material, it rotates as previously described. Such rotation carries bracket 76 with it. However, slidable member 90 is not displaced from its original position until such time as tank 12 has rotated sufficiently that end 86 contacts disc 104, and slides member 90 to a position where end wall 100 abuts end 120 of member 90. This latter position cuts pipe 44 off from communication with the atmosphere and provides a passage for the admitting of compressed air from source 62 into the inside of tank 12. As can be readily understood, the admission of the compressed air causes the material within tank 12 to be discharged as previously described. Because end 86 is spaced from tank 12 and disc 104 is free to shift within bracket 76, the returning of tank 12 toward its normal position as the material is discharged from within, will not cause slidable member 90 to shift within valve 92 until disc 104 is abutted by tank 12. Such distance may be preset to correspond with the empty position of tank 12 as will be readily understood, thereby providing for the complete discharge of material from within tank 12 before the source of compressed air is disconnected.

The position of member 90 just prior to tank 12 becoming completely filled, may have a tendency to practically shut off the communication with the atmosphere thus preventing sufficient material entering tank 12 to cause member 90 to reach a position where end 120 abuts end wall 100. To compensate for this tendency, aperture 110 is provided in member 90 to place port 108 in communication with end 112. This provides compressed air pressure entering port 108 to act against end wall 98 to force member 90 to a position where end 120 abuts end wall 100. Such air pressure provides for a positive shifting of member 90, thereby completely cutting off the vent and completely turning on the compressed air.

As can be readily understood, the functioning of the pneumatic control will repeat itself to provide for the cycle of intermittent filling and discharge of the material within tank 12 much as does the electrical control.

Although the apparatus embodying the principles of this invention has been described with relation to its utility as a means for handling material such as sewage, there is no intention to limit it to such use. It will be apparent that the apparatus disclosed herein has a wide range of possible uses in connection with any kind of flowable material.

Having thus described the invention, what is claimed as new and desired to be secured by Letters Patent is:

1. In a flowable material handling apparatus, the combination comprising: material container means; material conduit means having a torsionally resilient portion adapted to be twisted about its lengthwise axis relative to a remaining portion of said conduit; means for holding said remaining portion stationary; means mounting and disposing said container means on said resilient portion for torsional twisting of said resilient portion from its normal disposition responsive to the weight of material within said container means, means placing said container means in communication with said conduit means for flow of material therebetween; flow governing means for controlling the flow of material between said conduit means and container means; and control means operably coupled with said flow governing means for controlling the latter, said control means including parts mounted fixedly relative to said remaining portion of said conduit means and parts shiftably mounted for movement relative to said fixedly mounted parts when said resilient portion is distorted.

2. Apparatus as set forth in claim 1, wherein said flow governing means includes a source of fluid under pressure, supply line means for supplying said fluid to said material container means, vent means for placing the inside of said container means in communication with the atmosphere; and valve means for coupling said container means alternately with said vent means and said supply line means.

3. Apparatus as set forth in claim 2, wherein said supply line means and said vent means utilize a common pipe for communication with said container means.

4. Apparatus as set forth in claim 3, wherein said means placing said container means in communication with said conduit means includes an aperture common thereto, and said pipe extends through a part of said resilient portion and enters said container means through said aperture, said aperture being larger in cross section than said pipe.

5. Apparatus as set forth in claim 4, wherein said pipe is mounted fixedly relative to said remaining portion of said conduit means and is in spaced relationship to said part of said remaining portion of said conduit means, said aperture clearing said pipe when said resilient portion is in any condition of said torsional twisting and said container means is in any position thereof.

6. Apparatus as set forth in claim 2, wherein said control means includes a source of electrical energy, electrically responsive means operably coupled with said valve means for actuating the latter, first switch means operable when said resilient portion is torsionally twisted to an intermediate position thereof, second switch means operable when said resilient portion is further torsionally twisted to a limiting position thereof, a relay having a relay switch and a coil for operating said relay switch, first circuit means electrically coupling said electrically responsive means and said coil in parallel, second circuit means electrically coupling said first switch, said relay switch and said first circuit means in series and across said source, and third circuit means electrically coupling said second switch in parallel with said series connected first switch and relay switch.

7. Apparatus as set forth in claim 2, wherein said control means includes means providing a lost motion mechanical connection between said container means and said valve means.

8. In a flowable material handling apparatus, the combination comprising: a closed material container; material conduit means having a torsionally resilient portion adapted to be torsionally rotated about its lengthwise axis relative to the remainder of said conduit means; means mounting said container means on said portion of said conduit means with the center of gravity of material within said container means laterally offset from said lengthwise axis for torsional rotation of said portion by the force of the weight of material within said container means; means placing said container means in communication with said conduit means for flow of material therebetween; a projection extending laterally from the remainder of said conduit means for preventing torsional rotation of said remainder when said portion is rotated; first control means mounted on an extension of said lateral projection; second control means mounted on said container and responsive to the rotational movement of the latter, said second control means being operably coupled with said first control means; fluid supply means for supplying a source of gas under pressure to the inside of said container means; vent means for placing the inside of said container at atmospheric pressure, and valve means operably coupled with said second control means for alternately coupling said fluid supply means and said vent means with said container means responsive to the condition of torsional rotation.

9. In sewage ejecting apparatus of the type accumulating a predetermined amount of sewage before ejection thereof, said apparatus comprising:
(A) sewage container means, and
(B) means for ejecting sewage from said container means, the improvement in means for actuating said ejecting means comprising:
 (1) elastically deflectable metallic sewage conduit means,
 (2) said container means being supported by a portion of said conduit means in a manner that directly transmits weight of sewage in said container means to said conduit means so as to elastically deflect same,
 (3) there being communicating openings in said container means and conduit means permitting flow of sewage therebetween,
 (4) elastic deflection of said conduit means resulting from a predetermined weight of sewage in said container means causing actuation of said ejecting means to eject sewage from said container means,
 (5) and elastic recovery of said conduit means causing said ejection means to cease ejection of sewage.

10. In sewage ejecting apparatus of the type accumulating a predetermined amount of sewage before ejection thereof, said apparatus comprising:
(A) metallic sewage container means, and
(B) means for pneumatically ejecting sewage from said container means, the improvement in means for actuating said ejecting means comprising:
 (1) elastically deflectable metallic sewage conduit means,
 (2) said container means being directly secured to a side portion of said conduit means by metal to metal connection so that said conduit means supports weight of sewage in said container means in a manner that causes elastic deflection of said conduit means,
 (3) there being communicating openings in said container means and conduit means permitting flow of sewage therebetween,
 (4) elastic deflection of said conduit means resulting from a predetermined weight of sewage in said container means causing actuation of said ejecting means to eject sewage from said container means,
 (5) and elastic recovery of said conduit means causing said ejection means to cease ejection of sewage.

11. In sewage ejecting apparatus of the type accumulating a predetermined amount of sewage before ejection thereof, said apparatus comprising:
(A) sewage container means, and
(B) means for ejecting sewage from said container means, the improvement in means for actuating said ejecting means comprising:
 (1) torsionally resilient sewage conduit means having a lengthwise axis,
 (2) said container means being secured to a side portion of said conduit means with the longitudinal axis of said container means lying in a plane substantially perpendicular to said lengthwise axis, there being communicating openings in said container means and conduit means permitting flow of sewage therebetween,
 (3) the center of gravity of said container means being located laterally beyond said conduit means so as to cause torsion of said conduit means about said lengthwise axis, and
 (4) torsional movement of said conduit means about said lengthwise axis resulting from a predetermined amount of sewage in said container means causing operation of said ejecting means to eject sewage from said container means.

12. In sewage ejecting apparatus of the type accumulating a predetermined amount of sewage before ejection thereof, said apparatus comprising:
(A) sewage container means, and
(B) means for ejecting sewage from said container means, the improvement in means for actuating said ejecting means comprising:
 (1) torsionally resilient sewage conduit means having a lengthwise axis,
 (2) said container means being directly secured to a side portion of said conduit means, there being communicating openings in said container means and conduit means permitting flow of sewage therebetween,
 (3) said container means having a portion extending beyond said conduit means so as to cause torsion of said conduit means about said lengthwise axis,
 (4) torsional movement of said conduit means about said lengthwise axis resulting from a predetermined amount of sewage in said container means causing operation of said ejecting means to eject sewage from said container means,
 (5) and resilient torsional recovery of said conduit means to a predetermined position causing said ejection means to cease ejection of sewage.

13. In sewage ejecting apparatus of the type accumulating a predetermined amount of sewage before ejection thereof, said apparatus comprising:
(A) metallic sewage container means, and
(B) means for pneumatically ejecting sewage from said container means, the improvement in means for actuating said ejecting means comprising:
 (1) torsionally resilient metallic sewage conduit means having a lengthwise axis,
 (2) said container means being secured to a side portion of said conduit means by a direct metal to metal connection, there being communicating openings in said container means and conduit means permitting flow of sewage therebetween,
 (3) said container means having a portion laterally offset from said conduit means so as to cause torsion of said conduit means about said lengthwise axis, and
 (4) torsional movement of said conduit means about said lengthwise axis resulting from a predetermined amount of sewage in said container means causing operation of said ejecting means to eject sewage from said container means.

14. In sewage ejecting apparatus of the type accumulating a predetermined amount of sewage before ejection thereof, said apparatus comprising:

(A) sewage container means, and
(B) means for pneumatically ejecting sewage from said container means, the improvement in means for actuating said ejecting means comprising:
   (1) torsionally resilient metal sewage conduit means having a lengthwise axis, and having a sewage inflow end and a sewage outflow end,
   (2) said container means being directly secured to a side portion of said conduit means between said inflow and outflow ends, there being communicating openings in said container means and conduit means permitting flow of sewage therebetween,
   (3) said container means having a portion extending beyond said conduit means so as to cause torsional rotation of said conduit means about said lengthwise axis, and
   (4) torsional rotation of said conduit means in one direction about said lengthwise axis resulting from a predetermined amount of sewage in said container means causing operation of said ejecting means to eject sewage from said container means,
   (5) and resilient torsional recovery rotation of said conduit means in the opposite direction causing said ejection means to cease ejection of sewage.

15. In flowable material handling apparatus, the combination comprising: material container means; material conduit means having a resilient portion adapted to be distorted relative to a remaining portion of said conduit; means disposing said container means on said resilient portion for distortion of said resilient portion from its normal disposition responsive to the amount of material within said container means, means comprising an aperture common to said container means and conduit means for placing said container means in communication with said conduit means for flow of material therebetween; flow governing means for controlling the flow of material between said conduit means and container means comprising a source of fluid under pressure, supply line means for supplying said fluid to said material container means, vent means for placing the inside of said container means in communication with the atmosphere, and valve means for coupling said container means alternately with said vent means and said supply line means, said supply line means and said vent means utilizing a common pipe for communication with said container means, said common pipe extending through a part of said resilient portion and entering said container means through said aperture, said aperture being larger in cross section than said common pipe, said common pipe being mounted fixedly relative to said remaining portion of said conduit means and being in spaced relationship to said part of said remaining portion of said conduit means, said aperture clearing said common pipe when said resilient portion is in any condition of said distortion and said container means is in any position thereof; and control means operably coupled with said flow governing means for controlling the latter, said control means including parts mounted fixedly relative to said remaining portion of said conduit means and parts shiftably mounted for movement relative to said fixedly mounted parts when said resilient portion is distorted.

References Cited in the file of this patent

UNITED STATES PATENTS

| | | |
|---|---|---|
| 508,150 | Schutzinger | Nov. 7, 1893 |
| 1,295,446 | Deniget | Feb. 25, 1919 |
| 2,434,027 | Whittington | Jan. 6, 1948 |
| 2,596,593 | Paxton | May 13, 1952 |
| 2,899,908 | Nemecsek | Aug. 18, 1959 |
| 2,943,578 | McCombie | July 5, 1960 |

FOREIGN PATENTS

| | | |
|---|---|---|
| 659,041 | France | June 24, 1929 |
| 665,949 | Great Britain | Feb. 6, 1952 |